(12) United States Patent
Tanaka et al.

(10) Patent No.: US 9,391,722 B2
(45) Date of Patent: Jul. 12, 2016

(54) CARRIER LEAKAGE CORRECTION DEVICE AND CARRIER LEAKAGE CORRECTION METHOD

(71) Applicant: Panasonic Intellectual Property Management Co., Ltd., Osaka (JP)

(72) Inventors: Koichiro Tanaka, Hyogo (JP); Masashi Kobayashi, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/633,564

(22) Filed: Feb. 27, 2015

(65) Prior Publication Data

US 2015/0256208 A1 Sep. 10, 2015

(30) Foreign Application Priority Data

Mar. 7, 2014 (JP) ................................. 2014-045729

(51) Int. Cl.
  *H04B 7/00* (2006.01)
  *H04B 17/29* (2015.01)
  *H04B 17/00* (2015.01)

(52) U.S. Cl.
  CPC ............ *H04B 17/29* (2015.01); *H04B 17/0085* (2013.01)

(58) Field of Classification Search
  CPC .... H04B 1/0014; H04B 1/0039; H04B 1/525; H04B 1/1027
  USPC ............ 455/63.1, 114.2, 296, 423, 67.11, 75
  See application file for complete search history.

(56) References Cited

U.S. PATENT DOCUMENTS

| 4,717,894 | A | * | 1/1988 | Edwards | ................ | G01R 5/005 |
|---|---|---|---|---|---|---|
| | | | | | | 332/144 |
| 6,625,424 | B1 | * | 9/2003 | Mohindra | ................ | H03C 3/40 |
| | | | | | | 455/82 |
| 8,320,853 | B2 | * | 11/2012 | Okada | .................. | G06K 7/0008 |
| | | | | | | 455/127.1 |
| 8,706,055 | B2 | * | 4/2014 | Aparin | .................... | H04B 1/525 |
| | | | | | | 455/78 |
| 2006/0236188 | A1 | | 10/2006 | Behzad et al. | | |
| 2010/0240324 | A1 | * | 9/2010 | Okada | .................. | G06K 7/0008 |
| | | | | | | 455/75 |

FOREIGN PATENT DOCUMENTS

JP        8-213846        8/1996

* cited by examiner

*Primary Examiner* — Sonny Trinh
(74) *Attorney, Agent, or Firm* — Seed IP Law Group PLLC

(57) ABSTRACT

A carrier leakage correction device includes a non-modulation signal generator that outputs a first non-modulation signal having a first amplitude or a second non-modulation signal having a second amplitude larger than the first amplitude, a quadrature modulator that performs quadrature modulation on the first or second non-modulation signal and converts a first or second quadrature modulation signal into a high-frequency signal, an envelope detector that detects an envelope of the high-frequency signal, a correction value searcher that performs a search for a correction value giving a minimum value of a fluctuation amount of an envelope amplitude of the envelope detected by the envelope detector by changing a candidate for the correction value, and a corrector that adds the correction value obtained through the search of the correction value searcher to the first or second non-modulation signal.

14 Claims, 11 Drawing Sheets

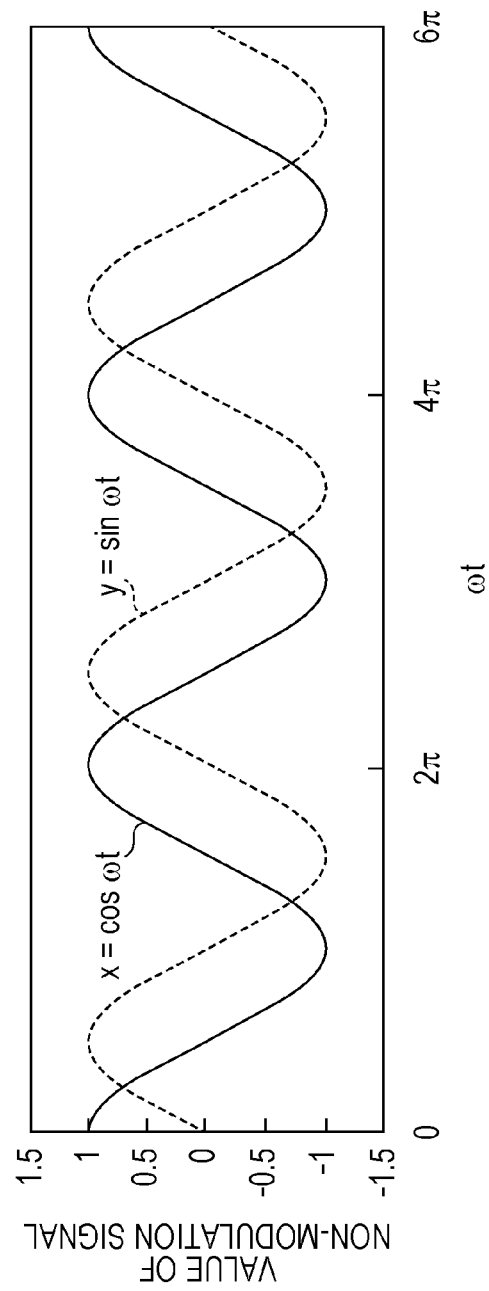

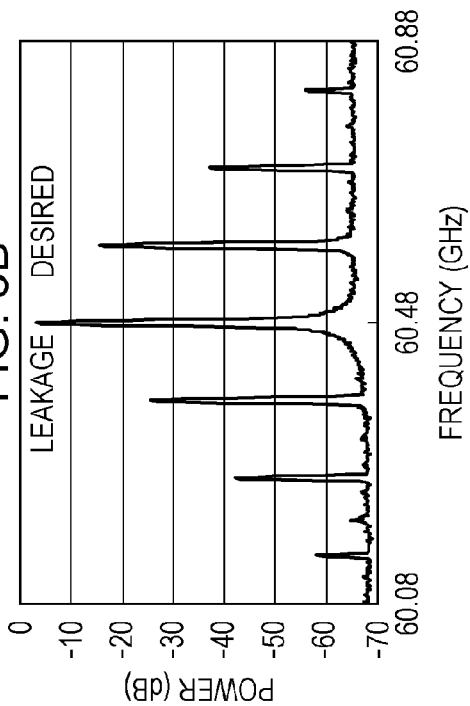
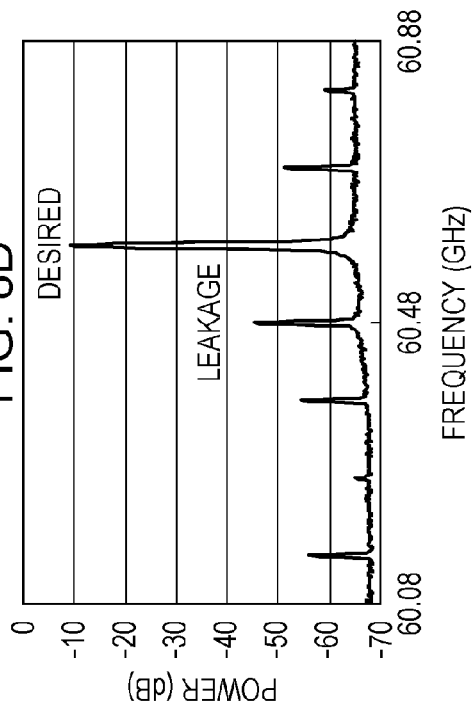
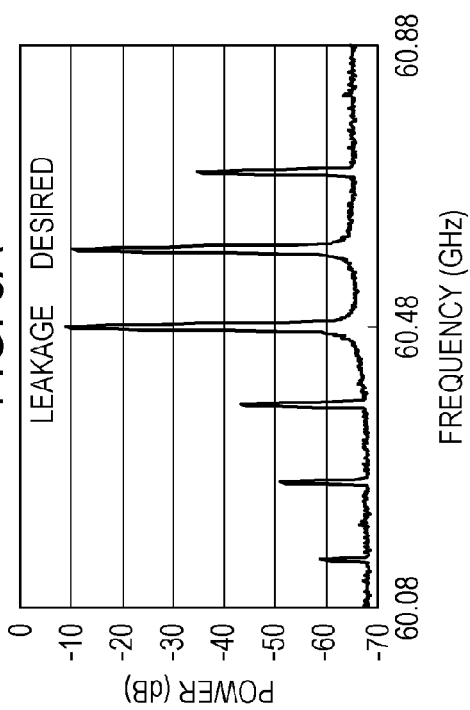
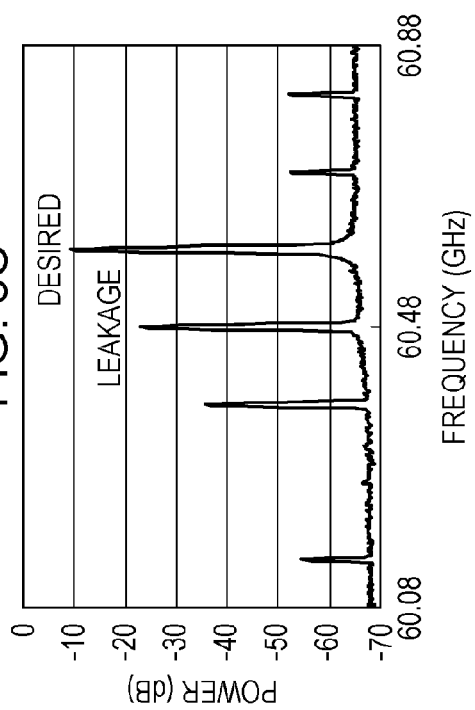

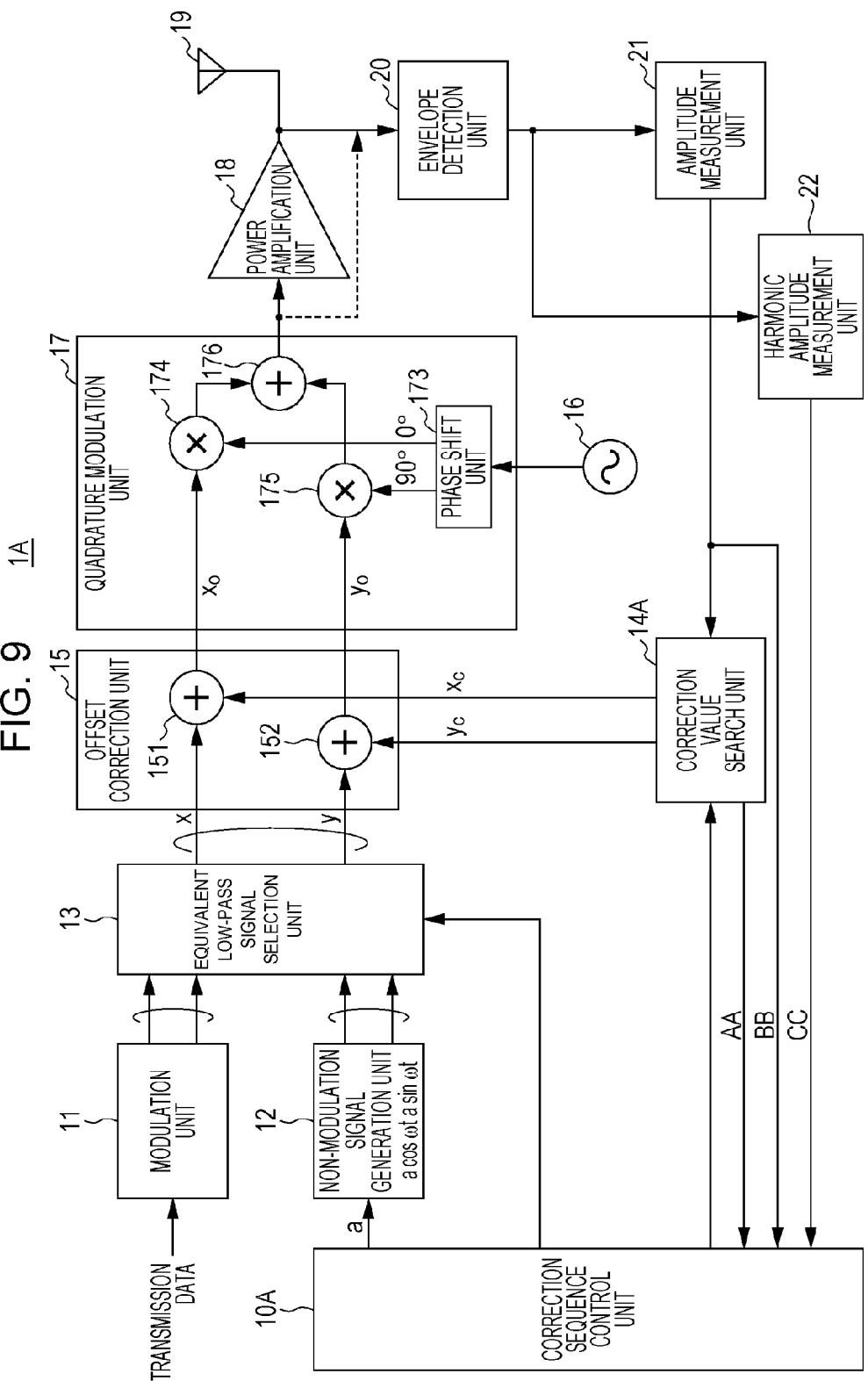

CARRIER LEAKAGE CORRECTION DEVICE AND CARRIER LEAKAGE CORRECTION METHOD

BACKGROUND

1. Technical Field

The present disclosure relates to a carrier leakage correction device and a carrier leakage correction method, which correct carrier leakage caused in a transmission modulation wave in a quadrature modulator.

2. Description of the Related Art

Standardization of IEEE802.11ad of the Institute of Electrical and Electronics Engineers (IEEE) as a communication standard for wireless local area networks (LANs) has been promoted in recent years. For example, IEEE802.11ad employs phase modulation, quadrature amplitude modulation, or orthogonal frequency division multiplexing (OFDM) as a modulation scheme for data transmission. Since such a modulation scheme is employed, a quadrature modulator is used so as to convert a baseband signal into a modulation signal of a microwave or a millimeter wave.

While the quadrature modulation is desirably performed in, for example, a band of a millimeter wave so as to inhibit increase in circuit scale, the millimeter wave has a high frequency and crosstalk of the high-frequency signal easily occurs inside the circuit of a transmission device, which is for example, a quadrature modulator, and carrier leakage easily occurs in the high-frequency signal after the quadrature modulation. The carrier leakage is an undesired component for the reception in a reception device and decreases the detection accuracy of a reception signal. Thus, when the transmission device generates a high-frequency signal, it is needed to suppress carrier leakage caused in the high-frequency signal in a quadrature modulator.

For example, U.S. Pat. No. 8,078,123 discusses a technique for suppressing carrier leakage caused in a high-frequency signal in a quadrature modulator. U.S. Pat. No. 8,078,123 discloses that a signal is supplied to the quadrature modulator and envelope detection is performed on the output of the quadrature modulator to obtain an amplitude, and an offset correction value input to the quadrature modulator so as to decrease a fluctuation amount of the amplitude is adjusted to suppress the carrier leakage.

SUMMARY

When a high-frequency signal, such as a microwave or a millimeter wave, is transmitted in radio communication based on U.S. Pat. No. 8,078,123, however, carrier leakage beyond correction tolerance occurs in a quadrature modulator and thus correction of the carrier leakage is difficult. As a result, the detection accuracy of a reception signal in a reception device is decreased.

One non-limiting and exemplary embodiment provides a carrier leakage correction device, which enables carrier leakage caused in quadrature modulation of a high-frequency signal to be suppressed while inhibiting decrease in detection accuracy of a reception signal.

In one general aspect, the techniques disclosed here feature a carrier leakage correction device, which includes a non-modulation signal generator that outputs a first non-modulation signal having a first amplitude or a second non-modulation signal having a second amplitude larger than the first amplitude, a quadrature modulator that performs quadrature modulation on the first or second non-modulation signal and converts a first or second quadrature modulation signal into a high-frequency signal, an envelope detector that detects an envelope of the high-frequency signal, a correction value searcher that performs a search for a correction value giving a minimum value of a fluctuation amount of an envelope amplitude of the envelope detected by the envelope detector by changing a candidate for the correction value, and a corrector that adds the correction value obtained through the search of the correction value searcher to the first or second non-modulation signal.

According to the present disclosure, carrier leakage caused in quadrature modulation of a high-frequency signal may be suppressed and decrease in detection accuracy of a signal may be inhibited.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 illustrates examples of non-modulation signals in a case where the amplitude of the non-modulation signals equals 1;

FIG. 8A illustrates an example of a transmission spectral measured value before correcting carrier leakage;

FIG. 8B illustrates an example of the transmission spectral measured value after correcting the carrier leakage using the amplitude of the non-modulation signal, which equals 1;

FIG. 8C illustrates an example of the transmission spectral measured value after correcting the carrier leakage using the amplitude of the non-modulation signal, which equals 2;

FIG. 8D illustrates an example of the transmission spectral measured value after correcting the carrier leakage using the amplitude of the non-modulation signal, which equals 1, after having corrected the carrier leakage using the amplitude of the non-modulation signal, which equals 2;

FIG. 9 is a circuit configuration diagram illustrating an internal configuration of a transmission device according to a second embodiment;

DETAILED DESCRIPTION

Figure 1:
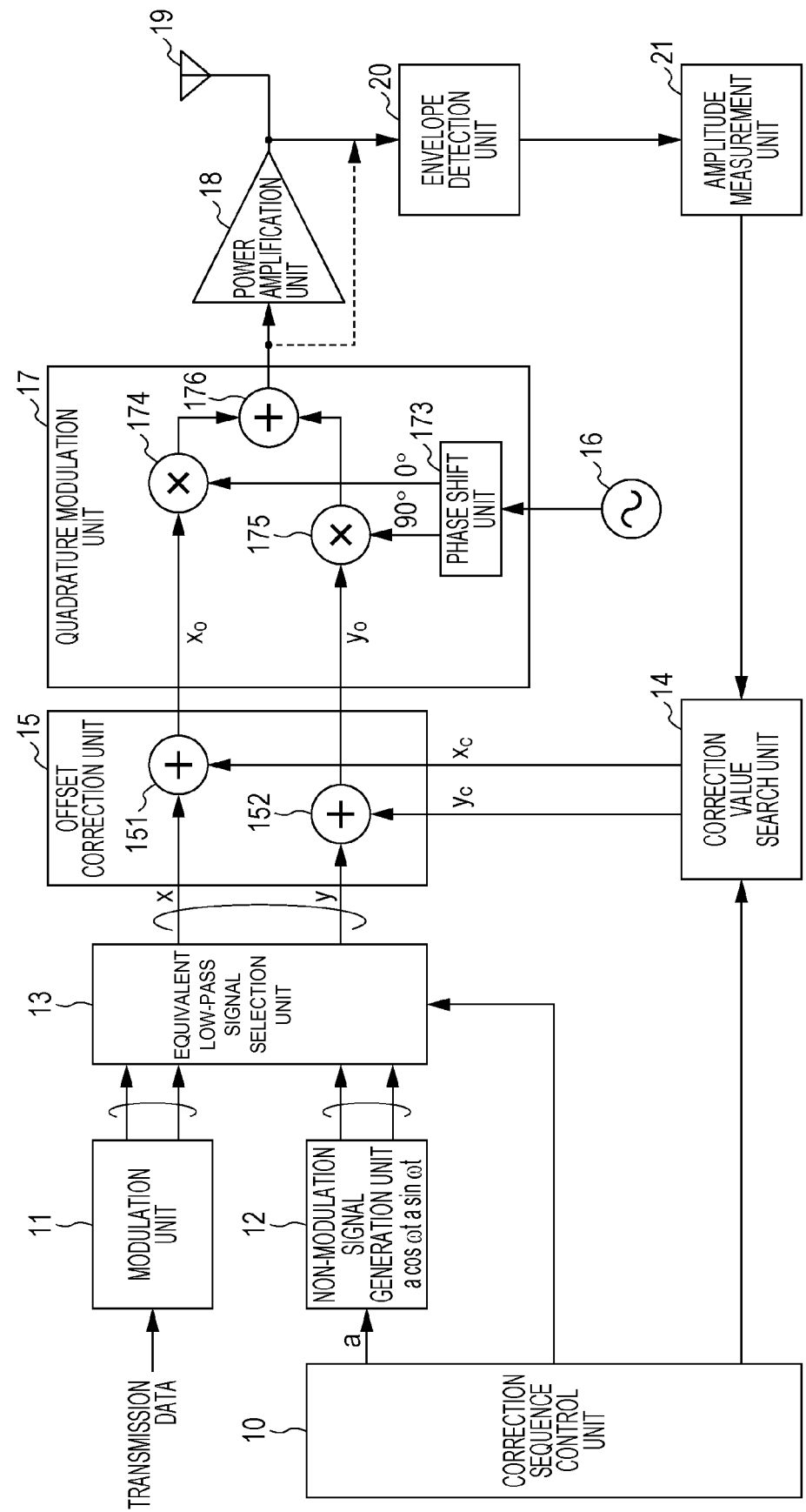
FIG. 1 is a circuit configuration diagram illustrating an internal configuration of a transmission device according to a first embodiment.

[Underlying Knowledge Forming Basis of Embodiments of Carrier Leakage Correction Device According to the Present Disclosure]

Prior to describing embodiments of a carrier leakage correction device according to the present disclosure, underlying knowledge forming the basis of each of the embodiments of the carrier leakage correction device according to the present disclosure is provided.

Specifically, in U.S. Pat. No. 8,078,123 described above, carrier leakage is corrected when a transmission modulation wave is transmitted in radio communication, and the amplitude of a signal for the correction of the carrier leakage and the amplitude of a transmission modulation wave for the radio communication are approximately the same in degree.

However, since in the carrier leakage correction device according to U.S. Pat. No. 8,078,123, carrier leakage caused by a quadrature modulator is increased by use of a high-frequency signal, such as a microwave or a millimeter wave, for radio communication, the magnitude of the carrier leakage may exceed the amplitude of the transmission modulation wave and the fluctuation amount of the envelope amplitude of the high-frequency signal is uneven, and accordingly, the suppression of the carrier leakage is insufficient.

Besides, due to manufacture unevenness or a temperature range of the quadrature modulator, a transmission modulation wave is transmitted while carrier leakage is insufficiently suppressed, and as a result, the detection accuracy of a reception signal in the reception device is decreased. Accordingly, a technique that may correct and sufficiently suppress carrier leakage is desired so as to transmit a high-frequency signal, such as a microwave, or a millimeter wave.

The embodiments below describe examples of a carrier leakage correction device that suppresses carrier leakage caused in the quadrature modulation of a high-frequency signal while inhibiting decrease in detection accuracy of a reception signal.

The embodiments of the carrier leakage correction device and a carrier leakage correction method according to the present disclosure are described below with reference to the drawings. Although in each of the embodiments, a transmission device is explained as an example of the carrier leakage correction device according to the present disclosure, another example may be expressed as a carrier leakage correction method that specifies operations of the transmission device. In each of the embodiments, the same reference numerals or symbols are given to the same constituents and the description of the same contents is simplified or omitted so that the other different contents are described.

First Embodiment

FIG. 1 is a circuit configuration diagram illustrating an internal configuration of a transmission device 1 according to a first embodiment. The transmission device 1 illustrated in FIG. 1 includes a correction sequence control unit 10, a modulation unit 11, a non-modulation signal generation unit 12, an equivalent low-pass signal selection unit 13, a correction value search unit 14, an offset correction unit 15, a local oscillator 16, a quadrature modulation unit 17, a power amplification unit 18 to which an antenna 19 is coupled, an envelope detection unit 20, and an amplitude measurement unit 21.

The correction sequence control unit 10 controls operations of the non-modulation signal generation unit 12, the equivalent low-pass signal selection unit 13, and the correction value search unit 14. For example, when the correction of carrier leakage, hereinafter abbreviated as the "carrier leakage correction," is performed in the transmission device 1, the correction sequence control unit 10 outputs a control signal for generating a non-modulation signal with an amplitude a as a first non-modulation signal with a first amplitude, which is described below, to the non-modulation signal generation unit 12 and outputs a control signal for selecting the non-modulation signal from between a modulation signal and the non-modulation signal to the equivalent low-pass signal selection unit 13. The correction sequence control unit 10 further outputs a control signal for outputting an offset correction value $(x_c, y_c)$ to the correction value search unit 14.

When a modulation signal (a transmission modulation wave) is transmitted, that is, the transmission of regular transmission data, hereinafter abbreviated as the "regular data transmission," is performed in the transmission device 1, the correction sequence control unit 10 outputs a control signal for selecting the modulation signal from between the modulation signal and the non-modulation signal to the equivalent low-pass signal selection unit 13 and further outputs a control signal for outputting the offset correction value $(x_c, y_c)$ obtained through search in the carrier leakage correction to the correction value search unit 14.

The modulation unit 11 modulates transmission data by a predetermined modulation scheme, such as binary phase shift keying (BPSK), quadrature phase shift keying (QPSK), or quadrature amplitude modulation (QAM), and outputs an equivalent low-pass signal (a modulation signal) indicating a modulation wave to the equivalent low-pass signal selection unit 13. For example, the modulation unit 11 adds a preamble, a header, and an error correction code to the transmission data and packetizes the resultant data.

The non-modulation signal generation unit 12 as an example of the non-modulation signal generation unit according to the present disclosure generates equivalent low-pass signals (non-modulation signals), which indicate a cosine wave and a sine wave, using the amplitude a specified by the control signal generated by the correction sequence control unit 10 and outputs the generated signals to the equivalent low-pass signal selection unit 13. The amplitude a is described below.

In the regular data transmission, according to the control signal generated by the correction sequence control unit 10, the equivalent low-pass signal selection unit 13 selects the equivalent low-pass signal (the modulation signal) generated by the modulation unit 11 and outputs the selected signal to the offset correction unit 15. Further, in the carrier leakage correction, according to the control signal generated by the correction sequence control unit 10, the equivalent low-pass signal selection unit 13 selects the equivalent low-pass signal (the non-modulation signal) generated by the non-modulation signal generation unit 12 and outputs the selected signal to the offset correction unit 15.

According to the control signal generated by the correction sequence control unit 10, the correction value search unit 14 searches for an offset correction value that gives the minimum value of a fluctuation amount w, which is described below, of the envelope amplitude measured by the amplitude measurement unit 21, and outputs the offset correction value $(x_c, y_c)$ obtained through the search to the offset correction unit 15. While $x_c$ represents an in-phase component of the offset correction value, $y_c$ represents an orthogonal component of the offset correction value.

In the regular data transmission, according to the control signal generated by the correction sequence control unit 10, the correction value search unit 14 outputs the offset correction value, which is a fixed value obtained through the search in the carrier leakage correction, to the offset correction unit 15. Further, in the carrier leakage correction, according to the control signal generated by the correction sequence control unit 10, the correction value search unit 14 outputs an initial value of the offset correction value or the offset correction value obtained through the search of the correction value search unit 14 to the offset correction unit 15.

The offset correction unit 15 as an example of the correction unit according to the present disclosure includes adders 151 and 152. The adder 151 adds the in-phase component of the signal selected by the equivalent low-pass signal selection unit 13 and the in-phase component $x_c$ of the offset correction value output by the correction value search unit 14 together and outputs the resultant component to the quadrature modulation unit 17. The adder 152 adds the orthogonal component of the signal selected by the equivalent low-pass signal selection unit 13 and the orthogonal component $y_c$ of the offset correction value output by the correction value search unit 14 together and outputs the resultant component to the quadrature modulation unit 17.

For example, the local oscillator 16 generates a carrier wave signal of a microwave band or a millimeter wave band and outputs the generated carrier wave signal to a phase shift unit 173 of the quadrature modulation unit 17.

The quadrature modulation unit 17 includes multipliers 174 and 175, and an adder 176, and performs quadrature modulation using the modulation signal or the non-modulation signal as the equivalent low-pass signal output by the offset correction unit 15 and the carrier wave signal output by the local oscillator 16 to convert the carrier wave signal into a high-frequency signal. The quadrature modulation unit 17 outputs the high-frequency signal to the power amplification unit 18.

In the quadrature modulation unit 17, an offset $x_o$ as the carrier leakage is added to the in-phase component of the equivalent low-pass signal output by the offset correction unit 15 and further, an offset $y_o$ as the carrier leakage is added to the orthogonal component of the equivalent low-pass signal output by the offset correction unit 15 (see FIG. 1).

The phase shift unit 173 generates an in-phase (0°) carrier wave signal and an orthogonal (90°) carrier wave signal based on the carrier wave signal generated by the local oscillator 16. The phase shift unit 173 outputs the in-phase carrier wave signal to the multiplier 174 and outputs the orthogonal carrier wave signal to the multiplier 175.

The multiplier 174 multiplies the in-phase component of the equivalent low-pass signal by the in-phase (0°) carrier wave signal and outputs the in-phase component of the high-frequency signal to the adder 176. The multiplier 175 multiplies the orthogonal component of the equivalent low-pass signal by the orthogonal (90°) carrier wave signal and outputs the orthogonal component of the high-frequency signal to the adder 176. The adder 176 adds the output of the multiplier 174 and the output of the multiplier 175 together and generates a high-frequency signal to output the high-frequency signal to the power amplification unit 18.

Although it is described above that the multipliers 174 and 175 of the quadrature modulation unit 17 modulate a local signal with the same frequency as a carrier wave frequency used for the regular data transmission, for example, a local signal with a frequency different from the carrier wave frequency used for the regular data transmission may be modulated and a frequency conversion unit arranged separately may perform the frequency conversion on the output of the quadrature modulation unit 17 to obtain the carrier wave frequency used for the regular data transmission.

The power amplification unit 18 amplifies the power of the high-frequency signal output by the quadrature modulation unit 17 and supplies the resultant signal to the antenna 19. The antenna 19 radiates the high-frequency signal amplified by the power amplification unit 18.

Part of the high-frequency signal output by the power amplification unit 18 or part of the high-frequency signal output by the quadrature modulation unit 17 (see the broken line in FIG. 1) is input to the envelope detection unit 20. When for example, the power amplification unit 18 has a multistage configuration, the illustration of which is omitted, part of a signal from an intermediate stage of the power amplification unit 18 may be input to the envelope detection unit 20.

The envelope detection unit 20 detects an envelope of the part of the high-frequency signal output by the power amplification unit 18 or the part of the high-frequency signal output by the quadrature modulation unit 17, and detects an envelope amplitude as the output of the envelope detection to output the envelope amplitude to the amplitude measurement unit 21.

The amplitude measurement unit 21 measures the temporal fluctuation amount w of the envelope amplitude detected by the envelope detection unit 20 and outputs the measured fluctuation amount w to the correction value search unit 14. The output of the envelope detection unit 20 may be input to the amplitude measurement unit 21 via a band-pass filter unit, which is not illustrated. The band-pass filter unit removes undesired components other than the frequency components of the fluctuation amount w of the envelope amplitude, which are caused by the carrier leakage in the quadrature modulation unit 17.

Since the envelope amplitude detected by the envelope detection unit 20 is input to the amplitude measurement unit 21, the amplitude measurement unit 21 may measure the fluctuation amount w of the envelope amplitude v with high accuracy. The band-pass filter unit removes undesired components other than the frequency components of the fluctuation amount w of the envelope amplitude using, for example, a filter that employs an analog element, a finite impulse response (FIR) filter, an infinite impulse response (IIR) filter, or a fast Fourier transform (FFT).

Operations relating to the carrier leakage correction in the transmission device 1 according to the present embodiment are described in more detail below.

The non-modulation signal generation unit 12 generates a cosine wave signal x expressed by mathematical equation 1 and a sine wave signal y expressed by mathematical equation 2, and outputs the generated signals to the equivalent low-pass signal selection unit 13. In mathematical equations 1 and 2, a represents the amplitude of a non-modulation signal, co represents an angular frequency, and t represents time. It is desirable for co to be selected within the frequency range of a modulation signal.

For example, since in IEEE802.11ad, the frequency range corresponds to frequencies of the millimeter wave's center frequency plus or minus approximately 1 GHz, 110 MHz×2π and 220 MHz×2π are used so as to cause the frequency range to be the center frequency plus or minus 1 GHz or less. FIG. 2 illustrates examples of the non-modulation signals in a case where the amplitude a of the non-modulation signal equals 1.

$$x = a \cos \omega t \quad \text{[Mathematical Equation 1]}$$

$$y = a \sin \omega t \quad \text{[Mathematical Equation 2]}$$

The offset correction unit 15 adds the offset correction value $x_c$ to the cosine wave signal x expressed by mathematical equation 1 and adds the offset $y_c$ to the sine wave signal y expressed by mathematical equation 2, and outputs non-modulation signals x1 and y1 expressed by mathematical equations 3 and 4, respectively, to the quadrature modulation unit 17.

$$x1 = x_c + a \cos \omega t \quad \text{[Mathematical Equation 3]}$$

$$y1 = y_c + a \sin \omega t \quad \text{[Mathematical Equation 4]}$$

The quadrature modulation unit 17 performs quadrature modulation on a carrier wave signal using the non-modulation signals x1 and y1. The quadrature modulation is affected by the offsets $x_o$ and $y_o$, which indicate the carrier leakage. That is, in the quadrature modulation, the offset $x_o$ indicating the carrier leakage is added to the non-modulation signal x1 and the offset $y_o$ indicating the carrier leakage is added to the non-modulation signal y1. A high-frequency signal s of a millimeter wave band is expressed by mathematical equation 5 as the output of the quadrature modulation unit 17. In mathematical equation 5, j is an imaginary unit.

$$s = (x_o + x_c + a \cos \omega t) + j(y_o + y_c + a \sin \omega t) \quad \text{[Mathematical Equation 5]}$$

In the carrier leakage correction in the transmission device 1 according to the present embodiment, the offset correction value $(x_c, y_c)$, which is $(-x_o, -y_o)$, as a correction factor for canceling the offsets $x_o$ and $y_o$ difficult to be measured are determined.

As a value based on the envelope amplitude v of the high-frequency signal s expressed by mathematical equation 5, for example, the envelope detection unit 20 outputs a value proportional to the envelope amplitude v or a value proportional to a square value of the envelope amplitude v. The envelope amplitude v is expressed by mathematical equation 6.

$$v = (a^2 + r^2 + 2ar \cos(\omega t - \theta))^{1/2} \quad \text{[Mathematical Equation 6]}$$

In mathematical equation 6, r and θ represent a radius and an angle, respectively, in a case where orthogonal coordinates $(x_o + x_c, y_o + y_c)$ are indicated in polar coordinates. An error r is expressed by mathematical equation 7.

$$r = ((x_o + x_c)^2 + (y_o + y_c)^2)^{1/2} \quad \text{[Mathematical Equation 7]}$$

Figure 3A:
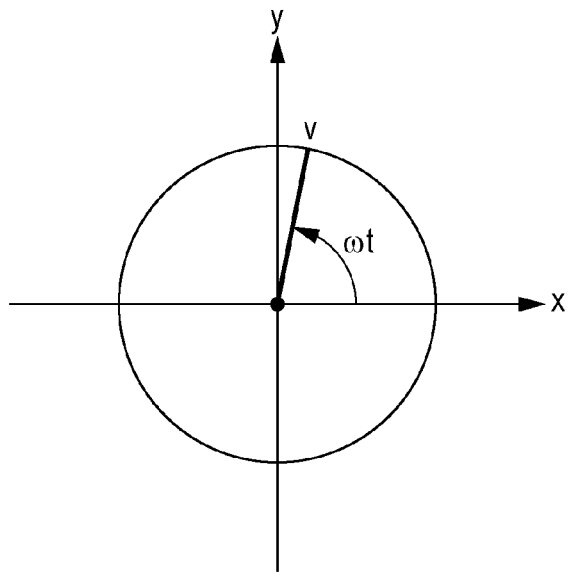
FIG. 3A is a diagram for explaining an envelope amplitude without carrier leakage.
Figure 3B:
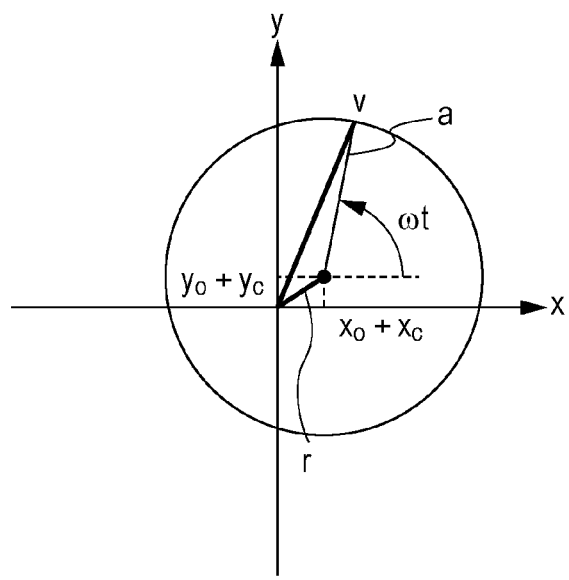
FIG. 3B is a diagram for explaining the envelope amplitude with carrier leakage.

The envelope amplitude is now described with reference to FIGS. 3A and 3B. FIG. 3A is a diagram for explaining the envelope amplitude v without carrier leakage. FIG. 3B is a diagram for explaining the envelope amplitude v with carrier leakage. The envelope amplitude v indicates a distance from the origin point of the orthogonal coordinate system illustrated in FIG. 3A or FIG. 3B, that is, from the origin point of the equivalent low-pass signal to a position on the circle illustrated in FIG. 3A or FIG. 3B.

When the carrier leakage is sufficiently suppressed, the cosine wave signal x and the sine wave signal y illustrated in FIG. 2 appear on the horizontal axis and the vertical axis of the orthogonal coordinate system, respectively, and the equivalent low-pass signal is expressed as a circle with the center positioned at the origin point as illustrated in FIG. 3A. Accordingly, the envelope amplitude v is constant.

When the suppression of the carrier leakage is insufficient, the equivalent low-pass signal is expressed as a circle with the center positioned at the coordinates $(x_o + x_c, y_o + y_c)$ of the orthogonal coordinate system as illustrated in FIG. 3B. That is, when the suppression of the carrier leakage is insufficient, the center point of the circle indicating the equivalent low-pass signal deviates from the origin point of the orthogonal coordinate system, depending on the error r. Thus, the envelope amplitude v fluctuates periodically as the time t, that is, the phase ωt elapses.

In mathematical equation 6, the term where the temporal fluctuation of the envelope amplitude v occurs corresponds to the component of $2ar \cos(\omega t - \theta)$. That is, decrease in the temporal fluctuation of the envelope amplitude v through the search for the offset correction value $(x_c, y_c)$ indicates that the error r expressed by mathematical equation 7 is reduced to 0. According to mathematical equation 7, the error r that equals 0 indicates that $(x_o + x_c, y_o + y_c) = (0,0)$ and this implies that it is achieved that $x_c = -x_o$ and $y_c = -y_o$.

Also in FIG. 3A, decrease in the fluctuation amount w of the envelope amplitude v indicates that the center of the circle that expresses the equivalent low-pass signal (see FIG. 3A or FIG. 3B) approaches the origin point of the orthogonal coordinate system, that is, that $(x_o + x_c, y_o + y_c)$ becomes $(0,0)$.

The amplitude measurement unit 21 measures the temporal fluctuation amount w of the envelope amplitude detected by the envelope detection unit 20. For example, the envelope detection unit 20 outputs the nth power of the envelope amplitude v and the amplitude measurement unit 21 outputs the fluctuation amount w expressed by mathematical equation 8 so as to measure a difference between a maximum value and a minimum value, that is, a peak-to-peak value.

$$w = (a+r)^n - |a-r|^n \quad \text{[Mathematical Equation 8]}$$

Figure 4A:
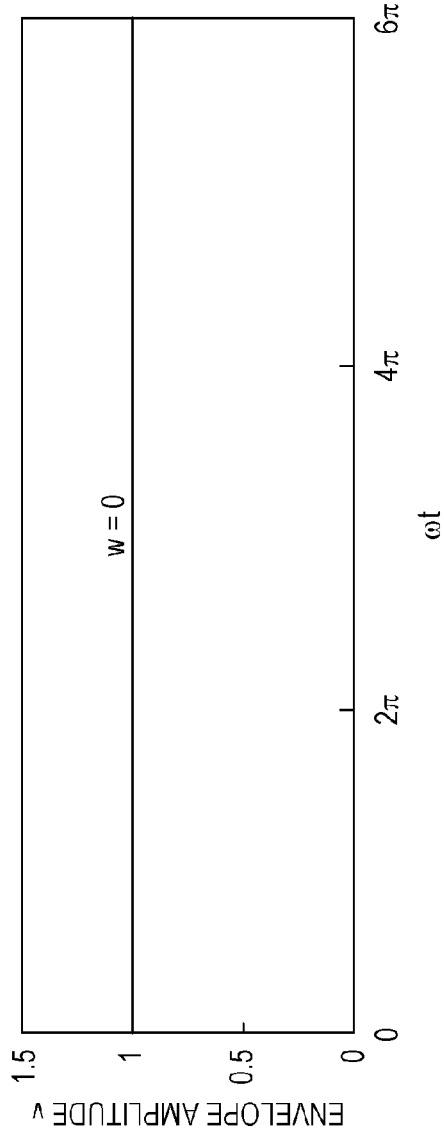
FIG. 4A illustrates examples of temporal fluctuations of the envelope amplitude without carrier leakage and a fluctuation amount.
Figure 4B:
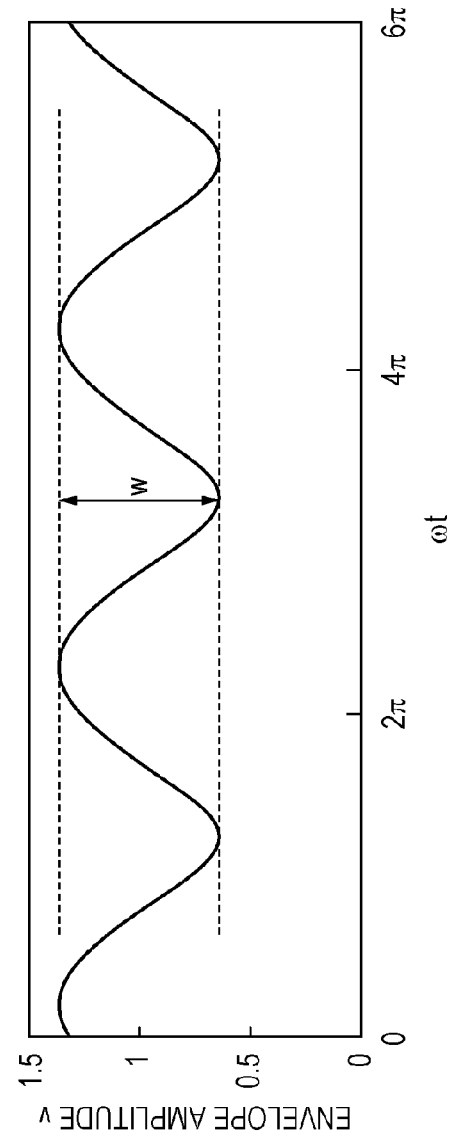
FIG. 4B illustrates examples of temporal fluctuations of the envelope amplitude with carrier leakage and the fluctuation amount.

FIG. 4A illustrates examples of the temporal fluctuations of the envelope amplitude v without carrier leakage and the fluctuation amount w. FIG. 4B illustrates examples of the temporal fluctuations of the envelope amplitude v with carrier leakage and the fluctuation amount w. Regarding FIGS. 4A and 4B, an integer n is 1 in mathematical equation 8 so as to simplify the explanation.

When the suppression of the carrier leakage is sufficient, the envelope amplitude v has a constant value and the fluctuation amount w equal to 0 as illustrated in FIG. 4A.

When the suppression of the carrier leakage is insufficient, the envelope amplitude v fluctuates periodically as illustrated in FIG. 4B. A fluctuation period of the envelope amplitude v is the same as a period of the non-modulation signal illustrated in FIG. 2. The fluctuation amount w illustrated in FIG. 4B is approximately 0.7.

The amplitude a of the non-modulation signal in mathematical equation 8 is a constant specified by the correction sequence control unit 10 and r is expressed by mathematical equation 7 while $x_o$ and $y_o$ in mathematical equation 7 are constants, which are unknown. Accordingly, the fluctuation amount w of the envelope amplitude v expressed by mathematical equation 8 is a function of the offset correction value $(x_c, y_c)$ as expressed in mathematical equation 9.

$$w = f(x_c, y_c) \quad \text{[Mathematical Equation 9]}$$

The correction value search unit 14 sets the offset correction value $(x_c, y_c)$ so as to decrease the fluctuation amount w expressed by mathematical equation 9 to a minimum value, which is ideally zero. Specifically, the correction value search unit 14 changes the offset correction value $(x_c, y_c)$ little by little from the initial value $(0,0)$ of the offset correction value $(x_c, y_c)$ and when the fluctuation amount w is reduced to the minimum value, the correction value search unit 14 ends the search for the offset correction value ($x_c, y_c$).

The initial value of the offset correction value ($x_c, y_c$) may be an arbitrary value other than (0,0). Further, the correction value search unit 14 may use a plurality of kinds of initial values to reduce the fluctuation amount w to the minimum value as a result of the search, and may select the offset correction value obtained through the search as the initial value.

For example, a method of searching for the offset correction value ($x_c, y_c$) performed in the correction value search unit 14 includes what is described below.

The correction value search unit 14 changes ($x_c, y_c$) into four values, that is, into ($x_{now}+\alpha, y_{now}$), ($x_{now}-\alpha, y_{now}$), ($x_{now}, y_{now}+\alpha$), and ($x_{now}, y_{now}-\alpha$), where ($x_{now}, y_{now}$) represents a current value of the offset correction value ($x_c, y_c$) and $\alpha$ represents a minute constant, and measures the fluctuation amount w. The correction value search unit 14 selects the offset correction value ($x_c, y_c$) that gives the minimum value of the fluctuation amount w as a new current value.

The correction value search unit 14 repeats the operation of changing the offset correction value into the four values using the constant $\alpha$ and when the fluctuation amount w in a case where the offset correction value ($x_c, y_c$) equals ($x_{now}, y_{now}$) is reduced to the minimum value by changing the offset correction value ($x_c, y_c$) into the four values, the correction value search unit 14 ends the search for the offset correction value.

Another method of searching for the offset correction value ($x_c, y_c$) is described below.

The correction value search unit 14 changes the offset correction value ($x_c, y_c$) in two values, that is, into ($x_{now}+\alpha, y_{now}$) and ($x_{now}-\alpha, y_{now}$) using a similarly minute constant $\alpha$ and measures the fluctuation amount w. The correction value search unit 14 selects the offset correction value ($x_c, y_c$) that gives the minimum value of the fluctuation amount w as a new current value.

The correction value search unit 14 repeats the operation of changing the offset correction value into the two values in the direction of x using the constant $\alpha$ and when the fluctuation amount w in a case where the offset correction value ($x_c, y_c$) equals ($x_{now}, y_{now}$) is reduced to the minimum value by changing the offset correction value ($x_c, y_c$) into the two values, the correction value search unit 14 ends the search for the offset correction value $x_c$ in the direction of x.

After that, the correction value search unit 14 changes the offset correction value ($x_c, y_c$) into two values, that is, into ($x_{now}, y_{now}+\alpha$) and ($x_{now}, y_{now}-\alpha$) and measures the fluctuation amount w. The correction value search unit 14 selects the offset correction value ($x_c, y_c$) that gives the minimum value of the fluctuation amount w as a new current value.

The correction value search unit 14 repeats the operation of changing the offset correction value into the two values in the direction of y using the constant $\alpha$ and when the fluctuation amount w in a case where the offset correction value ($x_c, y_c$) equals ($x_{now}, y_{now}$) is reduced to the minimum value by changing the offset correction value ($x_c, y_c$) into the two values, the correction value search unit 14 ends the search for the offset correction value $y_c$ in the direction of y.

The correction value search unit 14 may end the search when the search for the offset correction value $x_c$ in the direction x and the search for the offset correction value $y_c$ in the direction y for one time each, or may repeat similar operations for a plurality of times more. Thus, the offset correction value ($x_c, y_c$) that minimizes the fluctuation amount w may be obtained.

Figure 5A:
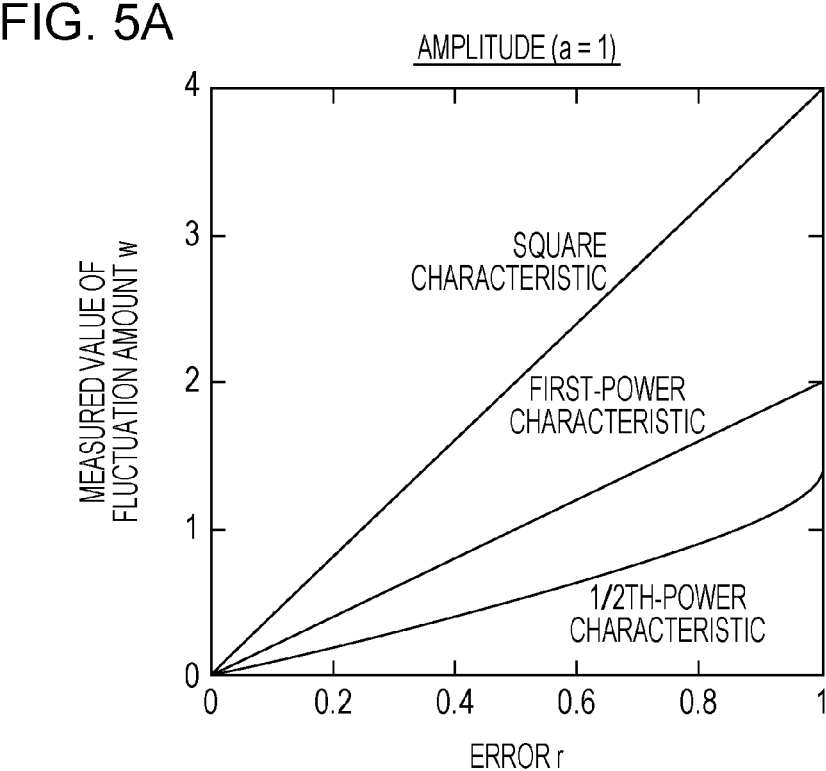
FIGS. 5A and 5B illustrate examples of detection characteristics of an envelope detection unit in a case where the amplitude of the non-modulation signal equals 1.
Figure 5B:
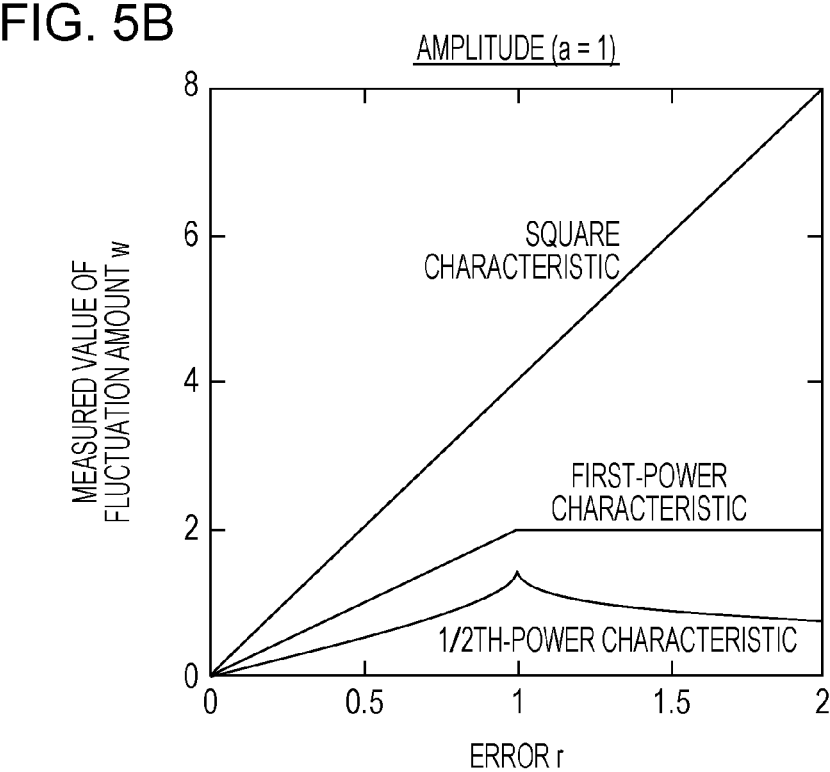

FIGS. 5A and 5B illustrates examples of detection characteristics of the envelope detection unit 20 in a case where the amplitude a of the non-modulation signal equals 1. That is, each of FIGS. 5A and 5B indicates the relation between the error r expressed by mathematical equation 7 and a measured value of the fluctuation amount w of the envelope amplitude v, which is measured by the amplitude measurement unit 21.

As the detection characteristics of the envelope detection unit 20, for example, FIG. 5A indicates a square characteristic, a first-power characteristic, and a ½th-power characteristic. For example, the square characteristic is often utilized so as to detect the amplitude of a relatively small signal using the nonlinearity of the circuit while the first-power characteristic is often utilized so as to use a rectifier that switches the on or off operation. Since the power supply voltage limits the output voltage regardless of the type of the circuit, an output is saturated with respect to a large input. As an example for expressing the saturation, the ½th-power characteristic is illustrated. The amplitude measurement unit 21 measures the peak-to-peak value, which is the difference between the maximum value and the minimum value of the fluctuation amount w of the envelope amplitude v, and outputs the measured value of the difference.

In FIG. 5A, the amplitude a of the non-modulation signal equals 1. Since in U.S. Pat. No. 8,078,123 described above, it is beyond expectation that the carrier leakage exceeds the amplitude a of a non-modulation signal, the range of the error r expressed by mathematical equation 7 is from 0 to 1. FIG. 5A illustrates that, with any one of the detection characteristics of the envelope detection unit 20, the fluctuation amount w monotonously increases or decreases, depending on the increase or decrease in the error r. Thus, the error r may be reduced to the minimum value, which is ideally zero, by changing the error r in the direction in which the fluctuation amount w decreases.

With a high frequency, such as the frequency of a microwave or a millimeter wave, crosstalk may easily occur in the quadrature modulation unit 17 and the carrier leakage may exceed the amplitude of a modulation wave, depending on the manufacture unevenness of an integrated circuit (IC). Thus, FIG. 5B illustrates the relation between the error r and the fluctuation amount w in a case where the range of the error r expressed by mathematical equation 7 is from 0 to 2.

Referring to FIG. 5B, when the characteristic of the envelope detection unit 20 is the square characteristic, which is ideal, the fluctuation amount w increases or decreases, depending on the increase or decrease in the error r expressed by mathematical equation 7. When the characteristic of the envelope detection unit 20 is the first-power characteristic and the error r expressed by mathematical equation 7 is larger than 1, the fluctuation amount w is unchanged and flat.

Accordingly, when the carrier leakage caused in the quadrature modulation unit 17 is large, that is, the error r corresponding to the initial value of the offset correction value ($x_c, y_c$) is larger than 1, the fluctuation amount w remains unchanged as the error r varies and thus, it is difficult for the correction value search unit 14 to perform the search in the direction in which the error r decreases, and the search is highly likely to end in somewhere in the range where the error r is larger than 1.

When the characteristic of the envelope detection unit 20 is the ½th-power characteristic and the error r expressed by mathematical equation 7 is larger than 1, the fluctuation amount w decreases as the error r increases, and when the correction value search unit 14 performs the search in the direction in which the fluctuation amount w decreases, the error r increases.

Figure 6A:
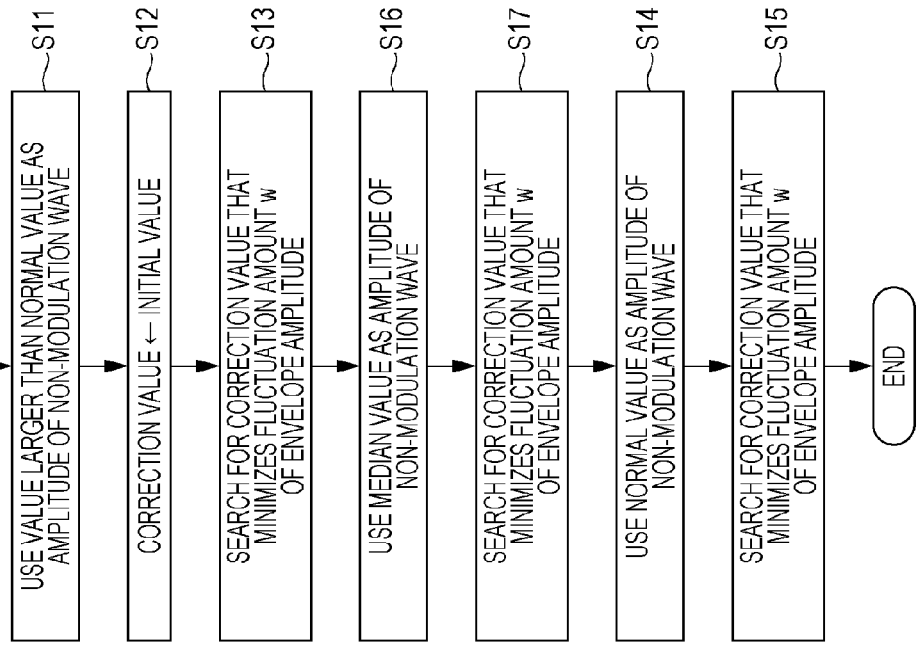
FIG. 6A is a flow chart for explaining an example of an operational procedure of the transmission device according to the first embodiment.
Figure 6B:
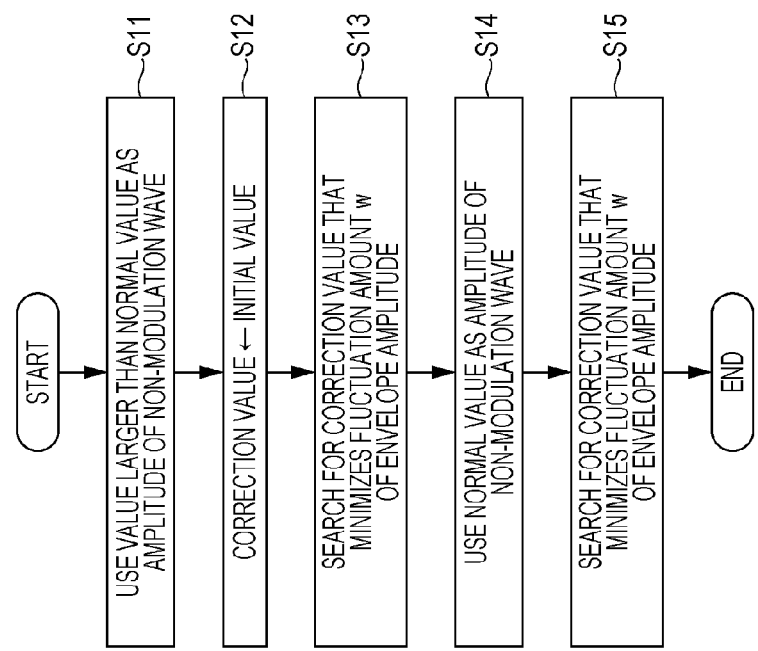
FIG. 6B is a flow chart for explaining another example of the operational procedure of the transmission device according to the first embodiment.

An operational procedure of the carrier leakage correction performed in the transmission device 1 according to the present embodiment is now described with reference to FIG. 6A or FIG. 6B. FIG. 6A is a flow chart for explaining an example of the operational procedure of the transmission device 1 according to the first embodiment. FIG. 6B is a flow chart for explaining another example of the operational procedure of the transmission device 1 according to the first embodiment. In the description of FIG. 6B, the same step numbers are given to the same contents as the contents in the description of FIG. 6A to simplify or omit the description of such contents and the other different contents are explained.

In FIG. 6A, the correction sequence control unit 10 outputs a control signal for generating a non-modulation signal with the amplitude a that equals 2 for example as a second non-modulation signal with a second amplitude, which is larger than a predetermined amplitude having a normal value, which equals 1 for example and is used for the regular data transmission, to the non-modulation signal generation unit 12 (S11). Then, the correction sequence control unit 10 outputs a control signal for selecting the non-modulation signal generated by the non-modulation signal generation unit 12 to the equivalent low-pass signal selection unit 13, and further outputs a control signal for outputting an initial value of the offset correction value $(x_c, y_c)$ to the correction value search unit 14 (S12).

In addition, the correction sequence control unit 10 outputs a control signal for performing a search for the offset correction value $(x_c, y_c)$ that gives the minimum value of the fluctuation amount w of the envelope amplitude v and outputting the offset correction value $(x_c, y_c)$ obtained through the search to the correction value search unit 14 (S12).

After step S12, according to the control signal generated by the correction sequence control unit 10, the correction value search unit 14 searches for the offset correction value $(x_c, y_c)$ that gives the minimum value of the fluctuation amount w using the output of the amplitude measurement unit 21, which is the fluctuation amount w of the envelope amplitude v (S13). The method of searching for the offset correction value $(x_c, y_c)$ performed in the correction value search unit 14 is described in detail above and the explanation on the method is omitted.

Figure 7:
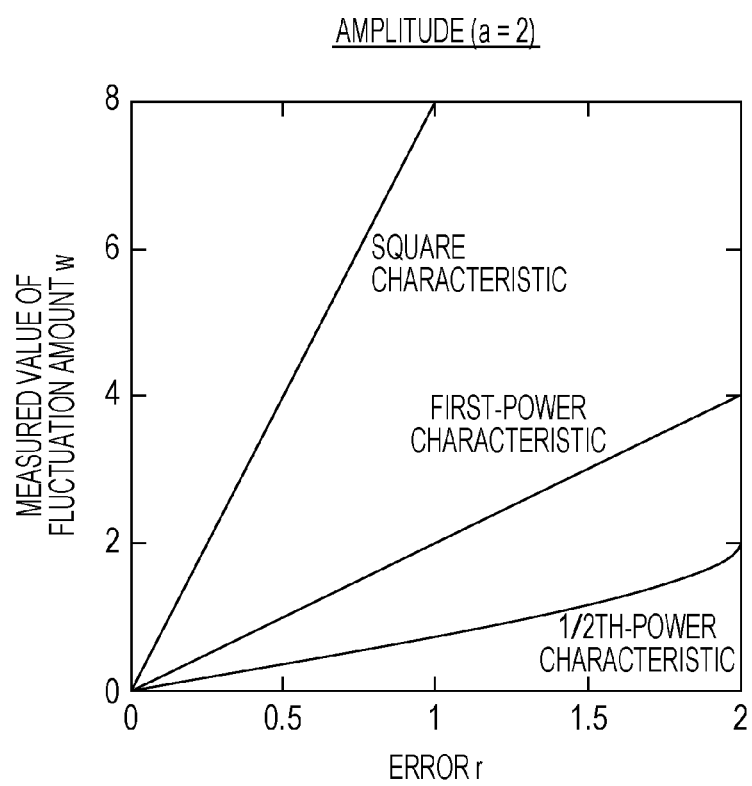
FIG. 7 illustrates examples of detection characteristics of the envelope detection unit in a case where the amplitude of the non-modulation signal equals 2.

FIG. 7 illustrates examples of the detection characteristics of the envelope detection unit 20 in a case where the amplitude a of the non-modulation signal equals 2. That is, the relation between the error r expressed by mathematical equation 7 and the measured value of the fluctuation amount w of the envelope amplitude v is indicated in FIG. 7. The range of the error r in FIG. 7 is from 0 to 2, which is twice as wide as the normal range where the error r is larger than 0 and smaller than 1.

Since the amplitude a equals 2 in FIG. 7, the fluctuation amount w monotonously increases or decreases, depending on the increase or decrease in the error r, with respect to all the characteristics of the envelope detection unit 20, which are the square characteristic, the first-power characteristic, and the ½th-power characteristic. Thus, the correction value search unit 14 may decrease the error r by shifting the error r in the direction in which the fluctuation amount w decreases. The correction value search unit 14 may determine the offset correction value $(x_c, y_c)$ that gives the minimum value of the fluctuation amount w of the envelope amplitude v at the time when the search for the offset correction value $(x_c, y_c)$ is completed.

When the amplitude a of the non-modulation signal has a value larger than the normal value equal to 1, the modulation is different from the quadrature modulation of a modulation wave using the amplitude with the normal value and thus, the offset correction value $(x_c, y_c)$ obtained through the search performed when a=2 is different from the offset correction value obtained through the search performed when a=1. However, the difference between the offset correction values is smaller than 1 when indicated using the value of the error r.

Thus, after S13, the correction sequence control unit 10 outputs a control signal for generating a non-modulation signal with the amplitude a of the predetermined amplitude, which has for example, the normal value equal to 1, to the non-modulation signal generation unit 12 (S14). Then, the correction sequence control unit 10 outputs a control signal for selecting the non-modulation signal generated by the non-modulation signal generation unit 12 to the equivalent low-pass signal selection unit 13 and further outputs a control signal for outputting the initial value of the offset correction value $(x_c, y_c)$ to the correction value search unit 14 (S15).

In addition, the correction sequence control unit 10 outputs a control signal for performing a search for the offset correction value $(x_c, y_c)$ that gives the minimum value of the fluctuation amount w of the envelope amplitude v and outputting the offset correction value $(x_c, y_c)$ obtained through the search to the correction value search unit 14 (S15). The search for the offset correction value $(x_c, y_c)$ in step S15 is based on the relation between the error r and the fluctuation amount w, which is illustrated in FIG. 5A.

That is, the correction value search unit 14 starts the search using the offset correction value $(x_c, y_c)$ capable of making the error r smaller than 1 and thus, the minimum value of the error r (the minimum value of the fluctuation amount w) may be obtained at the time when the search for the offset correction value $(x_c, y_c)$ is completed. The offset correction value $(x_c, y_c)$ that gives the minimum value of the error r (the minimum value of the fluctuation amount w) is similar to the state in which the quadrature modulation is performed on a modulation signal in the regular data transmission.

FIG. 8A illustrates an example of a transmission spectral measured value before correcting the carrier leakage. FIG. 8B illustrates an example of the transmission spectral measured value after correcting the carrier leakage using the amplitude a of the non-modulation signal, which equals 1. FIG. 8C illustrates an example of the transmission spectral measured value after correcting the carrier leakage using the amplitude a of the non-modulation signal, which equals 2. FIG. 8D illustrates an example of the transmission spectral measured value after correcting the carrier leakage using the amplitude a of the non-modulation signal, which equals 1, after having corrected the carrier leakage using the amplitude a of the non-modulation signal, which equals 2.

Each of FIGS. 8A to 8D illustrates the transmission spectral measured value in a case where the modulation signal of 110 MHz with the amplitude that has the normal value equal to 1 is output. In each of FIGS. 8A to 8D, the horizontal axis indicates the frequency in GHz while the vertical axis indicates power in dB, which is a relative value. Since the center frequency of the modulation is 60.48 GHz, a desired modulation wave appears at 60.59 GHz and the carrier leakage appears at 60.48 GHz.

In FIG. 8A, the transmission spectral measured value before correcting the carrier leakage is illustrated and the carrier leakage that is larger than the desired modulation wave by approximately 1 dB is measured.

FIG. 8B illustrates the transmission spectral measured value after correcting the carrier leakage using the modulation wave with the amplitude a that has the normal value equal to 1, and the carrier leakage is much larger than the desired modulation wave.

FIG. 8C illustrates the transmission spectral measured value after correcting the carrier leakage using the non-modulation wave with the amplitude a equal to 2 for example, which is larger than the amplitude a having the normal value equal to 1, and the carrier leakage is suppressed, compared to the transmission spectral measured value before the carrier leakage correction, which is illustrated in FIG. 8A. The carrier leakage is suppressed by approximately 13 dB, which is insufficient as the modulation accuracy of the transmission data in the transmission device 1.

FIG. 8D illustrates the transmission spectral measured value after further correcting the carrier leakage using the non-modulation wave with the amplitude a that has the normal value equal to 1 after having corrected the carrier leakage using the non-modulation wave with the amplitude a equal to 2 for example, which is larger than the amplitude a with the normal value equal to 1. Referring to FIG. 8D, in the transmission device 1 according to the present embodiment, the carrier leakage caused in the quadrature modulation unit 17 may be suppressed by approximately 35 dB and the transmission data may be modulated with high accuracy and thus, decrease in the signal detection accuracy in the reception device may be inhibited.

As described above, before modulating and transmitting the transmission data, the transmission device 1 according to the present embodiment uses the non-modulation signal with the amplitude a equal to 2 for example, which is larger than the amplitude a having the normal value equal to 1 for example, and searches for the offset correction value $(x_c,y_c)$ that gives the minimum value of the fluctuation amount w of the envelope amplitude v of the high-frequency signal generated according to the non-modulation signal.

Thus, the transmission device 1 may suppress the carrier leakage caused in the quadrature modulation unit 17. Further, since when the transmission data is modulated and transmitted before the carrier leakage correction, the transmission device 1 adds the offset correction value $(x_c,y_c)$ to the modulation signal of the transmission data using the offset correction value $(x_c,y_c)$ obtained through the search in the carrier leakage correction, even when the quadrature modulation is performed on the modulation signal of the transmission data, a high-frequency signal with suppressed carrier leakage may be generated and decrease in the detection accuracy of a reception signal in the reception device may be inhibited.

Although it is described above that in the present embodiment, the transmission device 1 uses a total of two kinds of amplitudes to correct carrier leakage, which are for example, the amplitude a of the non-modulation signal that has a value larger than the normal value equal to 1 and the amplitude a of the non-modulation signal that has the normal value equal to 1, three kinds of amplitudes may be used to correct the carrier leakage (see FIG. 6B).

In FIG. 6B, for example, a search for the offset correction value $(x_c,y_c)$, which uses an amplitude having a median value between the amplitude a equal to 2, which is larger than the normal value equal to 1, and the amplitude a that has the normal value equal to 1 (S16 and S17) is added between step S13 and step S14 to the flow chart illustrated in FIG. 6A.

Thus, the transmission device 1 may use a large value as the amplitude a of the non-modulation signal used in step S11, which equals 3 for example, compared to the operational procedure in FIG. 6A, and accordingly, a larger amount of carrier leakage may be corrected.

Second Embodiment

In the first embodiment, the transmission device 1 searches for the offset correction value $(x_c,y_c)$ for an initial time using an amplitude having a value equal to 2 for example, which is larger than the normal value equal to 1 for example, as the amplitude a of the non-modulation signal. In a communication environment in which it is rare for the carrier leakage to exceed the amplitude of the modulation signal of the transmission data, the search for the offset correction value $(x_c,y_c)$ for the initial time is highly likely to be useless. For example, since in a pre-shipment check of the transmission device 1, the carrier leakage is measured after searching for the offset correction value $(x_c,y_c)$, time needed for the pre-shipment check increases.

In the second embodiment, a transmission device 1A searches for the offset correction value $(x_c,y_c)$ for the initial time using the normal value, which is equal to 1 for example, as the amplitude a of the non-modulation signal. When the offset correction value $(x_c,y_c)$ that may minimize the fluctuation amount w of the envelope amplitude v is not obtained as a search result, that is, when the suppression of the carrier leakage is insufficient, similar to the first embodiment, the transmission device 1A searches for the offset correction value $(x_c,y_c)$ using the non-modulation signal with the amplitude a equal to 2 for example, which is larger than the normal value equal to 1 for example (see FIG. 10).

FIG. 9 is a circuit configuration diagram illustrating an internal configuration of the transmission device 1A according to the second embodiment. The transmission device 1A illustrated in FIG. 9 includes a correction sequence control unit 10A, a modulation unit 11, a non-modulation signal generation unit 12, an equivalent low-pass signal selection unit 13, a correction value search unit 14A, an offset correction unit 15, a local oscillator 16, a quadrature modulation unit 17, a power amplification unit 18 to which an antenna 19 is coupled, an envelope detection unit 20, an amplitude measurement unit 21, and a harmonic amplitude measurement unit 22. In the description of the elements illustrated in FIG. 9, the same reference numerals or symbols are given to the same contents as the contents in the description of the elements illustrated in FIG. 1 to simplify or omit the description of such contents and the other different contents are explained.

To search for the offset correction value $(x_c,y_c)$ for the initial time in the present embodiment, the correction sequence control unit 10A outputs a control signal for generating a non-modulation signal with the amplitude a having the normal value, which equals 1 for example, to the non-modulation signal generation unit 12.

Further, the correction sequence control unit 10A determines whether or not a predetermined condition is satisfied, and when it is determined that the predetermined condition is satisfied, the correction sequence control unit 10A determines that the suppression of the carrier leakage caused in the quadrature modulation unit 17 is insufficient. Below described are conditions 1 to 3 as the predetermined condition. The correction sequence control unit 10A determines whether or not the carrier leakage caused in the quadrature modulation unit 17 is sufficiently suppressed according to any one of or two or more of conditions 1 to 3 below.

Condition 1: With regard to the high-frequency signal obtained by performing quadrature modulation on the non-modulation signal with the amplitude a, which equals 1 for example, the offset correction value $(x_c,y_c)$ obtained through the search for the correction value search unit 14A exceeds the amplitude a of the non-modulation signal, which equals 1 for example.

Condition 2: With regard to the high-frequency signal obtained by performing quadrature modulation on the non-modulation signal with the amplitude a, which equals 1 for example, the fluctuation amount w of the envelope amplitude v measured by the amplitude measurement unit 21 exceeds a predetermined first threshold value, which is for example, 0.4.

Condition 3: With regard to the high-frequency signal obtained by performing quadrature modulation on the non-modulation signal with the amplitude a, which equals 1 for example, the envelope amplitude v of the harmonic measured by the harmonic amplitude measurement unit 22 exceeds a predetermined second threshold value (see FIGS. 11A and 11B).

Conditions 1 to 3 are described in detail below. Condition 1 corresponds to AA in FIG. 9, condition 2 corresponds to BB in FIG. 9, and condition 3 corresponds to CC in FIG. 9.

Firstly, condition 1 is described.

Determining whether or not the carrier leakage is sufficiently suppressed as a result of searching for the offset correction value $(x_c, y_c)$ using the non-modulation signal with the amplitude a having the normal value, which equals 1 for example, corresponds to determining what value the error r (see mathematical equation 7) illustrated in FIG. 5B is reduced to. When for example, the error r is reduced to a value near 0, which is smaller than 1, the fluctuation amount w of the envelope amplitude v is small, that is, the carrier leakage is sufficiently suppressed. In contrast, when the error r exceeds 1 and approaches a control limit value, which is for example, the minimum value or the maximum value of the offset correction value $(x_c, y_c)$ that the correction value search unit 14 may output, the fluctuation amount w of the envelope amplitude v increases, that is, the suppression of the carrier leakage is insufficient.

It is difficult to measure the error r expressed by mathematical equation 7 actually. In mathematical equation 7, a measurable variable is the offset correction value $(x_c, y_c)$. Originally, the search for the offset correction value $(x_c, y_c)$ is performed, assuming that the carrier leakage is smaller than the amplitude a of the non-modulation signal. Thus, when the offset correction value $(x_c, y_c)$ for canceling the carrier leakage exceeds the amplitude a of the non-modulation signal, the error r is not reduced to a value near 0, which is smaller than 1, and the suppression of the carrier leakage is insufficient.

Condition 2 is described next.

Whether or not the carrier leakage is sufficiently suppressed corresponds to whether the fluctuation amount w of the envelope amplitude v illustrated in FIG. 5B has a small value. In other words, when the fluctuation amount w of the envelope amplitude v is large, the suppression of the carrier leakage is insufficient. For example, when the fluctuation amount w of the envelope amplitude v is within the range illustrated in FIG. 5B, the first threshold value for determining whether or not the carrier leakage is sufficiently suppressed is 0.4. The first threshold value is not limited to 0.4.

Lastly, condition 3 is described.

When the suppression of the carrier leakage is insufficient, the carrier leakage is superimposed on the non-modulation signal and thus, the power increases and a signal distortion is caused in the quadrature modulation unit 17 and the power amplification unit 18. In FIG. 8B, since the suppression of the carrier leakage is insufficient and the distortion is caused, frequency components other than the non-modulation signal and the carrier leakage are large, compared to FIGS. 8C and 8D. The fluctuation amount w of the envelope amplitude v of such a signal includes remaining harmonic frequency components with the frequency of, for example, 220 MHz or 330 MHz, other than the frequency of the non-modulation wave, which is for example, 110 MHz.

Figure 11A:
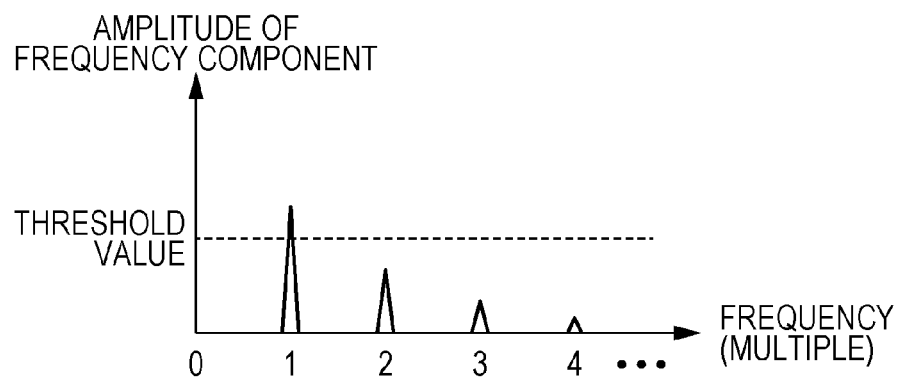
FIG. 11A illustrates an example of relation between the envelope amplitude and the frequency in a case where the carrier leakage is suppressed.
Figure 11B:
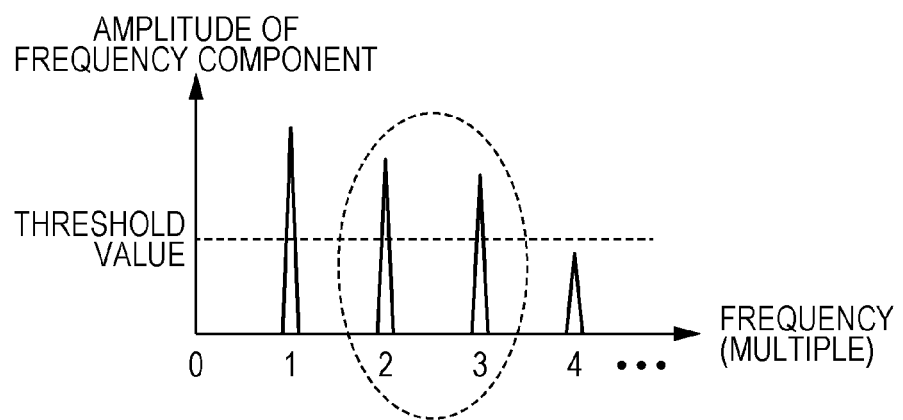
FIG. 11B illustrates an example of relation between the envelope amplitude and the frequency in a case where the suppression of the carrier leakage is insufficient.

FIG. 11A illustrates an example of the relation between the envelope amplitude v and the frequency in a case where the carrier leakage is sufficiently suppressed. FIG. 11B illustrates an example of the relation between the envelope amplitude v and the frequency in a case where the carrier leakage is suppressed insufficiently. In FIG. 11A, since the carrier leakage is sufficiently suppressed, frequency components with a frequency twice and three times as large as the frequency of the non-modulation signal are small.

In contrast, in FIG. 11B, since the suppression of the carrier leakage is insufficient, frequency components with a frequency twice and three times as large as the frequency of the non-modulation signal are large (see the broken line in FIG. 11B). The harmonic amplitude measurement unit 22 extracts harmonic components of the fluctuation amount w of the envelope amplitude v detected by the envelope detection unit 20 and measures the amplitude of the harmonic components. When the correction sequence control unit 10A determines that the amplitude of the harmonic components measured by the harmonic amplitude measurement unit 22 is smaller than the predetermined second threshold value, the correction sequence control unit 10A determines that the carrier leakage is sufficiently suppressed. On the contrary, when the correction sequence control unit 10A determines that the amplitude of the harmonic components measured by the harmonic amplitude measurement unit 22 is larger than the predetermined second threshold value, the correction sequence control unit 10A determines that the suppression of the carrier leakage is insufficient.

Figure 10:
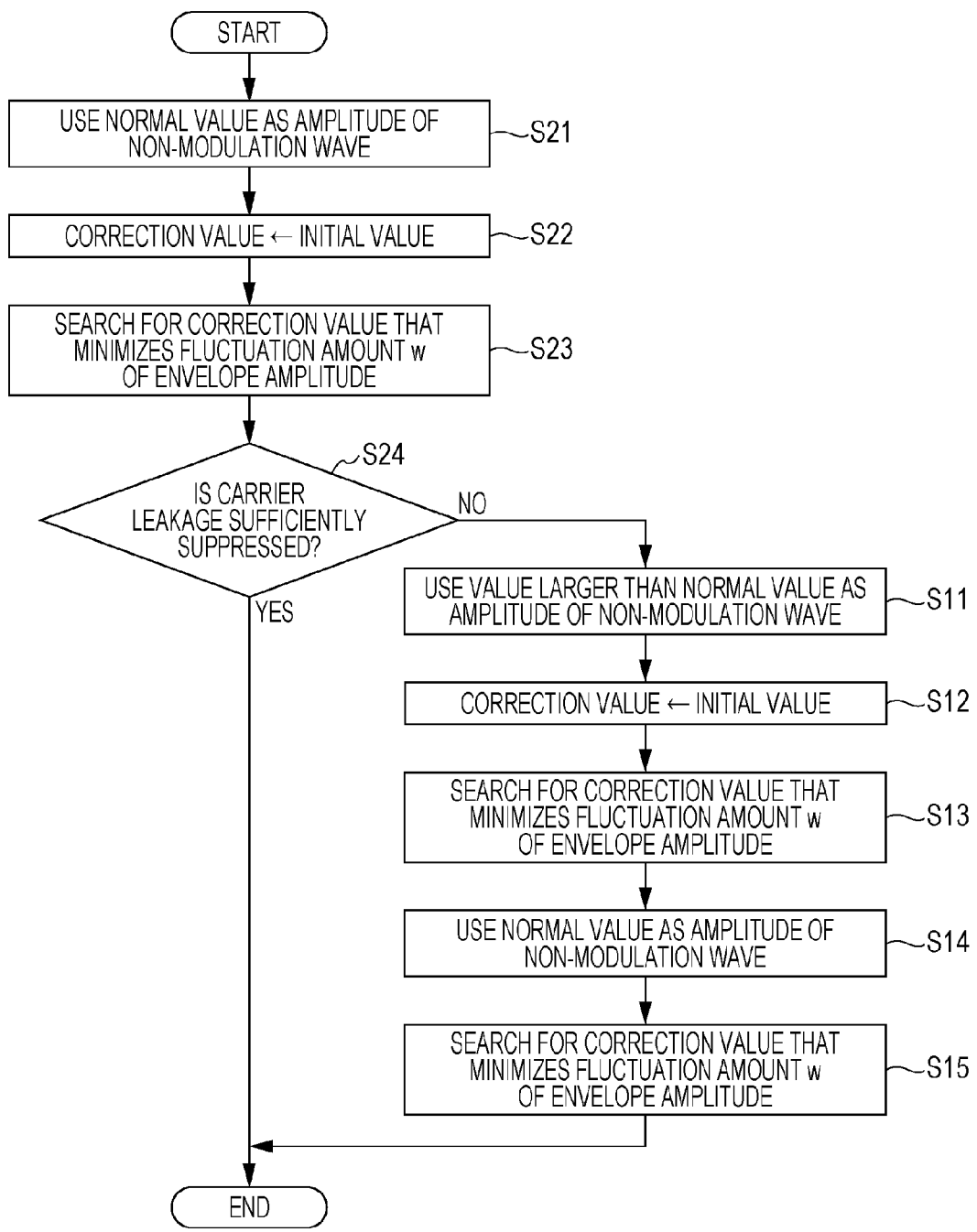
FIG. 10 is a flow chart for explaining an example of an operational procedure of the transmission device according to the second embodiment.

An operational procedure of the carrier leakage correction in the transmission device 1A according to the present embodiment is described with reference to FIG. 10. FIG. 10 is a flow chart for explaining an example of the operational procedure of the transmission device 1A according to the second embodiment. In the description of FIG. 10, the same step numbers are given to the same contents as the contents in the description of FIG. 6A to simplify or omit the description of such contents and the other different contents are explained.

In FIG. 10, the correction sequence control unit 10A outputs a control signal for generating a non-modulation signal with the amplitude a having the normal value, which equals 1 for example, to the non-modulation signal generation unit 12 (S21). The correction sequence control unit 10A outputs a control signal for selecting the non-modulation signal generated by the non-modulation signal generation unit 12 to the equivalent low-pass signal selection unit 13 and further outputs a control signal for outputting an initial value of the offset correction value $(x_c, y_c)$ to the correction value search unit 14A (S22).

In addition, the correction sequence control unit 10A outputs a control signal for performing a search for the offset correction value $(x_c, y_c)$ that gives the minimum value of the fluctuation amount w of the envelope amplitude v and outputting the offset correction value $(x_c, y_c)$ obtained through the search to the correction value search unit 14A (S22).

After step S22, according to the control signal generated by the correction sequence control unit 10A, the correction value search unit 14A searches for the offset correction value $(x_c, y_c)$ that gives the minimum value of the fluctuation amount w using the output of the amplitude measurement unit 21, which is the fluctuation amount w of the envelope amplitude v (S23). The detailed method of searching for the offset correction value $(x_c, y_c)$ performed in the correction value search unit 14A is similar to the first embodiment and the explanation on the method is omitted.

After step S23, according to whether or not any one of or two or more of conditions 1 to 3 described above are satisfied, the correction sequence control unit 10A determines whether or not the carrier leakage caused in the quadrature modulation unit 17 is sufficiently suppressed (S24). When the correction sequence control unit 10A determines that the carrier leakage is sufficiently suppressed (S24, YES), the operations of the transmission device 1A end.

When the correction sequence control unit 10A determines that the suppression of the carrier leakage is insufficient (S24, NO), similar to the first embodiment, the correction sequence control unit 10A performs step S11 and the steps after step S11.

As described above, the transmission device 1A according to the present embodiment searches for the offset correction value $(x_c, y_c)$ for the initial time using the normal value equal to, for example, 1 as the amplitude a of the non-modulation signal. When according to the offset correction value $(x_c, y_c)$ obtained as a search result of the initial time, the transmission device 1A determines that the carrier leakage is sufficiently suppressed, the transmission device 1A ends the search for the offset correction value, and when the transmission device 1A determines that the suppression of the carrier leakage is insufficient, similar to the first embodiment, the transmission device 1A starts the search for the offset correction value $(x_c, y_c)$ using the non-modulation signal with the amplitude a equal to, for example, 2, which is larger than the normal value equal to, for example, 1.

Thus, the transmission device 1A may provide the advantages of the transmission device 1 according to the first embodiment and also, in a communication environment in which it is rare for the carrier leakage to exceed the amplitude of the modulation signal of the transmission data, the search for the offset correction value $(x_c, y_c)$ using the non-modulation signal with the amplitude a equal to, for example, 2, which is larger than the normal value equal to, for example, 1 may be omitted. For example, in the pre-shipment check of the transmission device 1A, the carrier leakage may be sufficiently suppressed by at least searching for the offset correction value $(x_c, y_c)$ of the first time using the normal value equal to, for example, 1 as the amplitude a of the non-modulation signal, and as a result, time needed for the pre-shipment check may be reduced.

Moreover, according to the transmission device 1 of the above-described first embodiment or the transmission device 1A of the above-described second embodiment, the carrier leakage may be sufficiently suppressed even when the carrier leakage caused in the quadrature modulation unit 17 is large, depending on, for example, the manufacture unevenness or the temperature range that is used. Thus, a modulation signal with high modulation accuracy may be transmitted and decrease in communication quality may be inhibited.

Various aspects of the embodiments according to the present disclosure include what is described below.

A carrier leakage correction device according to a first aspect of the present disclosure includes a non-modulation signal generator that outputs a first non-modulation signal having a first amplitude or a second non-modulation signal having a second amplitude larger than the first amplitude, a quadrature modulator that performs quadrature modulation on the first or second non-modulation signal and converts the first or second quadrature modulation signal into a high-frequency signal, an envelope detector that detects an envelope of the high-frequency signal, a correction value searcher that performs a search for a correction value giving a minimum value of a fluctuation amount of an envelope amplitude of the envelope detected by the envelope detector by changing a candidate for the correction value, and a corrector that performs addition the correction value obtained through the search of the correction value searcher to the first or second non-modulation signal.

A carrier leakage correction device according to a second aspect of the present disclosure is the carrier leakage correction device according to the above-described first aspect, where the non-modulation signal generator outputs the first non-modulation signal after the correction value corresponding to the second non-modulation signal has been added to the second non-modulation signal.

A carrier leakage correction device according to a third aspect of the present disclosure is the carrier leakage correction device according to the above-described first aspect, which further includes an amplitude measurer that measures the fluctuation amount of the envelope amplitude.

A carrier leakage correction device according to a fourth aspect of the present disclosure is the carrier leakage correction device according to the above-described first aspect, where the non-modulation signal generator outputs the second non-modulation signal when a predetermined condition is satisfied the result of the addition of the correction value corresponding to the first non-modulation signal to the first non-modulation signal.

A carrier leakage correction device according to a fifth aspect of the present disclosure is the carrier leakage correction device according to the above-described fourth aspect, where the non-modulation signal generator outputs the second non-modulation signal when as the predetermined condition, the correction value corresponding to the first non-modulation signal exceeds the first amplitude.

A carrier leakage correction device according to a sixth aspect of the present disclosure is the carrier leakage correction device according to the above-described fourth aspect, where the non-modulation signal generator outputs the second non-modulation signal when as the predetermined condition, the fluctuation amount of the envelope amplitude corresponding to the first non-modulation signal exceeds a first threshold value.

A carrier leakage correction device according to a seventh aspect of the present disclosure is the carrier leakage correction device according to the above-described fourth aspect, which further includes a harmonic amplitude measurer that measures an envelope amplitude of a harmonic of a frequency of the first or second non-modulation signal, and in the carrier leakage correction device, the non-modulation signal generator outputs the second non-modulation signal when as the predetermined condition, the envelope amplitude of the harmonic exceeds a second threshold value.

A carrier leakage correction method of the carrier leakage correction device according to the above-described first aspect includes outputting a first non-modulation signal having a first amplitude or a second non-modulation signal having a second amplitude larger than the first amplitude, performing quadrature modulation on the first or second non-modulation signal and converting a first or second quadrature modulation signal into a high-frequency signal, detecting an envelope of the high-frequency signal, performing a search for a correction value that gives a minimum value of a fluctuation amount of an envelope amplitude of the detected envelope, and adding the correction value obtained through the search to the first or second non-modulation signal.

Although various embodiments are described above with reference to the drawings, it is needless to mention that the present disclosure is not limited to these examples. A person skilled in the art may obviously arrive at variations or modifications within the scope recited in the claims, and the variations or modifications should be understood as belonging to the technical scope of the present disclosure as a matter of course. Also, the constituents of the above-described embodiments may be combined as desired within the scope not departing from the spirit of the disclosure.

Although in the above-described present disclosure, a case in which the transmission device 1 is configured using hardware resources is explained as an example, part of the transmission device 1 may be configured using software that cooperates with hardware resources.

Each of the units (constituents) in the above-described embodiments is typically implemented as large-scale integration (LSI), which is an IC. The LSI may be made as one chip individually, or may be made as one chip so as to include part or all of the constituents. Depending on the degree of the integration, the LSI used here may be also referred to as an IC, system LSI, super LSI, or ultra LSI.

In addition, the circuit-integrating technique is not limited to the LSI, but a personal circuit or a general-purpose processor may be used for the implementation. After manufacturing the LSI, a field-programmable gate array (FPGA), which is programmable, or a reconfigurable processor capable of reconfiguring the connection and setting of circuit cells inside the LSI may be used.

Moreover, when a circuit-integrating technique that replaces the LSI is brought by the advance of the semiconductor technology or another derivative technique, each of the units of the reception device 100 may be integrated by the replacing technique. Application of biotechnology and the like are possible.

The present disclosure is advantageous as a carrier leakage correction device and a carrier leakage correction method, which enable carrier leakage caused in quadrature modulation of a high-frequency signal to be suppressed while inhibiting decrease in accuracy of signal detection.

What is claimed is:

1. A carrier leakage correction device comprising:
    non-modulation signal generation circuitry, which, in operation, outputs at least one of a first non-modulation signal having a first amplitude and a second non-modulation signal having a second amplitude larger than the first amplitude;
    quadrature modulation circuitry, which, in operation, performs quadrature modulation on one of the first non-modulation signal and the second non-modulation signal and converts one of a first quadrature modulation signal and a second quadrature modulation signal into a radio-frequency signal;
    envelope detection circuitry, which, in operation, detects an envelope of the radio-frequency signal;
    correction value searching circuitry, which, in operation, performs a search for a correction value giving a minimum value of a fluctuation amount of an envelope amplitude of the envelope detected by the envelope detector by changing a candidate for the correction value; and
    correction circuitry, which, in operation, performs addition of the correction value obtained through the search of the correction value searching circuitry to one of the first non-modulation signal and the second non-modulation signal.

2. The carrier leakage correction device according to claim 1, wherein the non-modulation signal generation circuitry, in operation, outputs the first non-modulation signal after the correction value corresponding to the second non-modulation signal has been added to the second non-modulation signal.

3. The carrier leakage correction device according to claim 1, further comprising:
    amplitude measurement circuitry, which, in operation, measures the fluctuation amount of the envelope amplitude.

4. The carrier leakage correction device according to claim 1, wherein the non-modulation signal generation circuitry, in operation, outputs the second non-modulation signal when a predetermined condition is satisfied as a result of the addition of the correction value corresponding to the first non-modulation signal to the first non-modulation signal.

5. The carrier leakage correction device according to claim 4, wherein the non-modulation signal generation circuitry, in operation, outputs the second non-modulation signal when as the predetermined condition, the correction value corresponding to the first non-modulation signal exceeds the first amplitude.

6. The carrier leakage correction device according to claim 4, wherein the non-modulation signal generation circuitry, in operation, outputs the second non-modulation signal when as the predetermined condition, the fluctuation amount of the envelope amplitude corresponding to the first non-modulation signal exceeds a first threshold value.

7. The carrier leakage correction device according to claim 4, further comprising:
    harmonic amplitude measurement circuitry, which, in operation, measures an envelope amplitude of a harmonic of a frequency of one of the first non-modulation signal and the second non-modulation signal, wherein
    the non-modulation signal generation circuitry, in operation, outputs the second non-modulation signal when, as the predetermined condition, the envelope amplitude of the harmonic exceeds a second threshold value.

8. A carrier leakage correction method of a carrier leakage correction device, the method comprising:
    outputting at least one of a first non-modulation signal having a first amplitude and a second non-modulation signal having an second amplitude larger than the first amplitude;
    performing quadrature modulation on one of the first non-modulation signal and the second non-modulation signal and converting one of a first quadrature modulation signal and a second quadrature modulation signal into a radio-frequency signal;
    detecting an envelope of the radio-frequency signal;
    performing a search for a correction value that gives a minimum value of a fluctuation amount of an envelope amplitude of the detected envelope; and
    adding the correction value obtained through the search to one of the first non-modulation signal and the second non-modulation signal.

9. The carrier leakage correction method according to claim 8, wherein the outputting of the at least one of the first non-modulation signal having the first amplitude and the second non-modulation signal having the second amplitude larger than the first amplitude includes outputting the first non-modulation signal after the correction value corresponding to the second non-modulation signal has been added to the second non-modulation signal.

10. The carrier leakage correction method according to claim 8, further comprising:
    measuring the fluctuation amount of the envelope amplitude.

11. The carrier leakage correction method according to claim 8, wherein the outputting of the at least one of the first non-modulation signal having the first amplitude and the second non-modulation signal having the second amplitude larger than the first amplitude includes outputting the second non-modulation signal when a predetermined condition is satisfied as a result of the adding of the correction value corresponding to the first non-modulation signal to the first non-modulation signal.

12. The carrier leakage correction method according to claim 11, wherein the outputting one of the first non-modulation signal having the first amplitude and the second non-modulation signal having the second amplitude larger than the first amplitude includes outputting the second non-modulation signal when, as the predetermined condition, the correction value corresponding to the first non-modulation signal exceeds the first amplitude.

13. The carrier leakage correction method according to claim 11, wherein the outputting of the at least one of the first non-modulation signal having the first amplitude and the second non-modulation signal having the second amplitude larger than the first amplitude includes outputting the second non-modulation signal when, as the predetermined condition, the fluctuation amount of the envelope amplitude corresponding to the first non-modulation signal exceeds a first threshold value.

14. The carrier leakage correction method according to claim 11, further comprising:
   measuring an envelope amplitude of a harmonic of a frequency of one of the first non-modulation signal and the second non-modulation signal, wherein
   the outputting of the at least one of the first non-modulation signal having the first amplitude and the second non-modulation signal having the second amplitude larger than the first amplitude includes outputting the second non-modulation signal when, as the predetermined condition, the envelope amplitude of the harmonic exceeds a second threshold value.

* * * * *